(12) United States Patent
Huonker

(10) Patent No.: US 7,722,192 B2
(45) Date of Patent: May 25, 2010

(54) INTEGRATED PROJECTOR INCLUDED IN A SEAT FOR DISPLAYING INFORMATION

(75) Inventor: Ulrich Huonker, Esslingen (DE)

(73) Assignee: Airbus Deutschland GmbH (DE)

( * ) Notice: Subject to any disclaimer, the term of this patent is extended or adjusted under 35 U.S.C. 154(b) by 367 days.

(21) Appl. No.: 11/765,017

(22) Filed: Jun. 19, 2007

(65) Prior Publication Data

US 2008/0106702 A1 May 8, 2008

Related U.S. Application Data

(60) Provisional application No. 60/818,110, filed on Jun. 30, 2006.

(30) Foreign Application Priority Data

Jun. 30, 2006 (DE) ............ 10 2006 030 194

(51) Int. Cl.
G03B 21/14 (2006.01)
(52) U.S. Cl. .................. 353/82; 353/12; 353/70; 345/169; 340/945

(58) Field of Classification Search ............ 353/82, 353/12, 70; 340/945; 345/169
See application file for complete search history.

(56) References Cited

U.S. PATENT DOCUMENTS

| | | | |
|---|---|---|---|
| 5,835,078 A * | 11/1998 | Arita et al. | 345/158 |
| 6,964,481 B2 * | 11/2005 | Pho et al. | 353/12 |
| 2008/0012728 A1 * | 1/2008 | Heym | 340/945 |

FOREIGN PATENT DOCUMENTS

| WO | WO 2005/056385 | 6/2005 |
|---|---|---|
| WO | WO 2005/076248 | 8/2005 |
| WO | WO2005/076248 | 8/2005 |
| WO | WO 2006/002852 | 1/2006 |

* cited by examiner

*Primary Examiner*—Georgia Y Epps
*Assistant Examiner*—Sultan Chowdhury
(74) *Attorney, Agent, or Firm*—Ostrolenk Faber LLP

(57) ABSTRACT

The invention comprises a system for displaying image elements for an aircraft seat. The system comprises a seat element with a projection device, and comprises an imaging region for imaging an image element. The image projection device is designed such that the image element can be projected on the imaging region.

14 Claims, 4 Drawing Sheets

INTEGRATED PROJECTOR INCLUDED IN A SEAT FOR DISPLAYING INFORMATION

REFERENCE TO RELATED APPLICATIONS

This application claims the benefit of the filing date of German Patent Application No. 10 2006 030 194.3 filed Jun. 30, 2006 and of U.S. Provisional Patent Application No. 60/818,110 filed Jun. 30, 2006, the disclosure of which applications is hereby incorporated herein by reference.

FIELD OF THE INVENTION

The present invention relates to a system and a method for displaying image elements for an aircraft seat, to a aircraft, and to the use of a system for displaying image elements for an aircraft seat in an aircraft.

BACKGROUND OF THE INVENTION

In function rooms or in passenger cabins of means of transport a multitude of seats are provided for the guests or the passengers, which seats have been placed in a particular arrangement. For orientation or information of the guests or the passengers, the seats comprise information devices. For example, the seats are consecutively numbered and individually allocated to passengers or guests. Furthermore, warning notes, for example drawing attention to the obligatory wearing of seat belts, can be in place.

In modern seats it is possible, for example, to display general information or seat-specific information for the guest or the passenger by means of displays that have been installed so as to be fixed, so that the particular seat comprises information that is specific to the guest or the passenger or to his neighbour. In order to display such information it is known to install fixed display elements, for example television monitors or LCD television monitors. From WO 2005/076248 it is known to provide a fixed or static display which can display various items of information or image elements to a passenger.

SUMMARY OF THE INVENTION

There may be a need to provide image elements on flexible imaging regions.

This need may be met by a system and by a method for displaying image elements for an aircraft seat, by the use of a system for displaying image elements for an aircraft seat in an aircraft, and by an aircraft comprising a system for displaying image elements for an aircraft seat with the characteristics according to the independent claims.

According to an exemplary embodiment of the invention, a system for displaying image elements for an aircraft seat is provided. In this arrangement the system comprises a seat element with an image projection device, and an imaging region for imaging an image element. The image projection device is designed such that the image element can be projected on the imaging region.

According to a further exemplary embodiment, a method for displaying image elements for an aircraft seat is provided. In the method an image element is projected onto an imaging region by means of an image projection device of a seat element.

According to a further exemplary embodiment of the invention, a system for displaying image elements for an aircraft seat in an aircraft is used.

In a further exemplary embodiment an aircraft with a system for displaying image elements for an aircraft seat is provided.

Below, the term "image projection device" refers, for example, to a video projector, a projection apparatus, a digital projector or a so-called beamer. The image projection device is a projector that images, onto a remote imaging region, graphic symbols or image elements onto a projection surface by means of light rays. Modern projection devices are available in various sizes, for example also in mini format. Therein, the actual optics of the projection device only take up the space of, for example, a sugar cube (see "Fraunhofer Magazin", February 2006 page 63). Hereinafter, the projection surface is designated "imaging region".

The imaging region refers to the region on which the information or the image elements are projected by the imaging projection device so that the information can be displayed in the form of image elements to a viewer. The size of the imaging region as well as the position and location of the imaging region are all controlled by the image projection device and are flexible, i.e. not fixed by geometric installation spaces or locations.

Image elements or other displayable information can, for example, be graphic symbols, texts, images as well as moving images such as, for example films or film sequences.

In the present invention an image projection device is integrated in a seat element so that image elements can be presented on an imaging region. This no longer needs a permanently installed display on which image elements have to be displayed in a fixed manner. The imaging region can be provided by the image projection device on flexible and self-determined locations so that the image elements can be displayed at variable locations. In particular in aircraft construction, but also in other passenger rooms or other function rooms with a large number of seats, the seating arrangement can thus be changed as desired, without limiting the ability to display image elements by displays that are installed so as to be fixed. For example, a seat row can be removed without such removal rendering impossible the possibility of displaying image elements or information. If a seat row is removed, the image projection device can project anew the imaging region at any desired other position. Furthermore, the projected information or image elements can be changed as desired. This is additionally associated with an advantage in that permanently installed warning displays in the surroundings of a seat can be replaced or supplemented. In aircraft cabins, due to safety directives, warning signals such as "no smoking" or "fasten seat belts" icons must always be installed within a certain field of view of a passenger. When seat configurations are changed, time-consuming reconfiguration work is necessary in order, apart from displacing the seats, to also displace the warning displays that have been installed so as to be fixed. By means of the image projection device the imaging region can be projected to any desired other positions without this involving reconfiguration periods, so that the information or the warning signs are nevertheless within the field of view of a passenger. Even after any displacement of seats, by projection from the seat, the display region is always in the same position from the point of view of a passenger, for example above the seat, so that the display region can be individually adjusted to the requirements of a passenger. Apart from the variable adaptation of the display position or of the imaging region, it is thus possible to project variable or changeable information. For example, variable information such as seat numbers, operating information, "fasten seat belts" warnings, requests to place the seatback upright, or icons, texts and images can be variably adjusted.

Thus, apart from the projected seat number, it is, for example, possible to project the name of the passenger. Thus the periods of time required for changes in the seating configuration can be reduced, and the convenience of a seat with an image projection device can be enhanced.

According to a further exemplary embodiment, the imaging region comprises position coordinates. In this arrangement the image projection device is adapted to flexibly adjust the position coordinates of the imaging region so that said imaging region is displaceable. By means of the image projection device the imaging region can be adapted so as to be variable and flexible in various locations in order to image information or image elements. For example, if the projector or the image projection device is installed in the seat element, then the light beam which images the graphic image elements in the imaging region can be changed or altered so that the imaging region is thus adjustable. When compared to a display that is installed so as to be fixed, a flexible imaging region can be provided which images information at any desired location. Generally speaking, position coordinates are positions of points in a spatial arrangement, which points describe a particular position of an element.

According to a further exemplary embodiment, the image projection device comprises an image adjustment device for adjusting the image characteristics of the image element. The image adjustment device can be provided by adjustable optical components such as adjustable lens- and screen systems. This provides the option of adjusting the image characteristics of the image element to changed imaging regions. Image characteristics can, for example, refer to image definition, image size or image brightness. The image element can therefore be focused, made sharp, enlarged or reduced in size. It is thus also possible to enlarge the imaging region for persons with impaired vision so that the image characteristics of the image elements can be individually matched to the requirements of passengers. The image adjustment device can, for example, be operated manually or automatically.

According to a further exemplary embodiment of the present invention, the system further comprises a control unit. The control unit is designed to control the image projection device automatically and independently. By means of the control unit the image projection device or the image adjustment device can be controlled by the control unit for the purpose of adjusting the image characteristics. By means of the control unit, for example light guidance or the location of the imaging region and the image characteristics of the image elements, for example focusing, can be automatically changed by way of the control system. This can be provided by way of an electromechanical rotary bearing arrangement of the image projection device. The control unit can control light guidance depending on the seat adjustment. Furthermore, by way of switches or other controls that are activated by the passenger or by the cabin crew, the control unit, the image adjustment device or the image projection device can be controlled.

According to a further exemplary embodiment, the image projection device comprises position coordinates. In this arrangement the control unit is designed to control the image projection device depending on the position coordinates of the image projection device and depending on the position coordinates of the imaging region. Thus based on a knowledge of the individual position coordinates the control unit can adjust the image characteristics of the image element automatically or independently. In the case of predetermined spacing, for example between the imaging region and the image projection device, a predetermined quality can be set.

According to a further exemplary embodiment of the present invention, the control unit is designed to control the image projection device if the position coordinates change. In this arrangement, the position coordinates can be selected from the group comprising the position coordinates of the image projection device and the position coordinates of the imaging region. The control unit can thus automatically and independently adjust the characteristics of the image element to a changed distance between the image projection device and the imaging region so that good image quality is always ensured. For example, if a passenger changes the seat position, for example by sliding the seat, by changing the seat height or by moving the backrest, thus changing the position coordinates of the image projection device, then due to the change in the position coordinates of the image projection device the control unit can automatically focus the image element projected onto the imaging region and can adjust its size. Thus when a viewer changes the position of the image projection device or of the imaging region, good quality of the image element is maintained without said viewer having to adjust the image anew.

According to a further exemplary embodiment, the image projection device comprises a first position sensor. In this arrangement the first position sensor is designed to determine the position coordinates of the image projection device. Position sensors can, for example, comprise optical sensors that measure the distance to a reference point or by way of other position sensors. Furthermore, a seat element can comprise sensors so that for example the inclination, the height adjustment, the displacement, etc. of a seat element is measurable, from which the position coordinates of the image projection device in relation to the imaging region can be calculated. By means of the control unit the light guidance and focusing when the seat is adjusted and thus when a change in the position of the image projection device or of the imaging region takes place, the image element can be adjusted anew so that the display location and the image definition or focus remain unchanged.

According to a further exemplary embodiment, the imaging region comprises a second position sensor. In this arrangement the second position sensor is designed such that position coordinates of the imaging region can be determined. Thus when a change in the imaging region takes place the new position coordinates can be calculated by means of the second position sensors so that the quality of the image element remains unchanged. Passenger convenience is thus enhanced since there is no longer any need for manually readjusting the image characteristics. The position coordinates of the imaging region can also be determined by calculating the position of the image projection device or of the seat position.

In a further exemplary embodiment the seat element comprises a seat-state sensor. In this arrangement the seat-state sensor is designed to determine seat-state data of the aircraft seat. The control unit is designed to evaluate the seat-state data and to display it in the imaging region by means of the image projection device. Seat-state data comprises, for example, the seat belt fastening status of a seat element and/or the occupation status of a seat element. This makes it possible to detect whether a seat element is occupied or is free, and whether the person or passenger has the seat belt fastened as required. The seat-state sensors measure this seat-state data so that the control unit can present corresponding information in the imaging region for the passenger. If a passenger's seat belt is for example not fastened, then it is possible to automatically present a warning signal in the imaging region, which warning signal points out the danger to the passenger. In this way passenger safety can be enhanced.

According to a further exemplary embodiment, the imaging region is arranged in a first region. In this arrangement the first region can be selected from the group comprising the backrest of a seat, the armrest of a seat, a seat cover, an overhead region and a floor region.

According to a further exemplary embodiment, the image projection device is arranged in a second region. In this arrangement the second region is selected from the group comprising the backrest of a seat, the armrest of a seat, a seat cover and a headrest. The image projection device can thus be very flexibly arranged at various locations, and in addition can project the imaging region to any desired location. For example, the image projection device can be provided in an armrest of a seat, and the imaging region can be provided on the backrest of the seat in front. Accordingly the imaging region can, for example, be on the floor or in an overhead region, on a stowage bin or on some other ceiling elements. The imaging region can therefore be flexibly adapted to many locations.

According to a further exemplary embodiment, the control unit is arranged in the seat element. Each seat element thus comprises a decentralised control unit, affixed to each seat, so that the seat can be exchanged as a complete module.

According to a further exemplary embodiment, the system comprises a multitude of seat elements, wherein each of the seat elements comprises an image projection device. The control unit is designed to control the image projection devices of the multitude of seat elements. Such a central control unit can thus communicate with a multitude of seat elements and can thus from a remote position control the image characteristics of the image element centrally for a multitude of seat elements. In addition, the central control unit can centrally control the information displayed in the imaging region. For example, in this way a member of the cabin crew can thus centrally select, and have displayed on each imaging region various warning displays for all the seats or all the passengers.

According to a further exemplary embodiment, at least the control units and/or the image projection devices are adapted for connection to a network. By way of the network, information can be provided, wherein the image projection device is designed to represent the information or the image elements in the imaging region. Seat-specific or general information can thus be sent to the control unit and/or to the image projection device by way of the network so that said information can be imaged in the imaging region. Seat-specific information can, for example, include the names of the persons to whom the seats have been allocated, or general information such as a general obligation to wear seat belts, or a "no smoking" display. Information can also, for example, comprise films, motion pictures, or still photos. It is thus possible to individually and flexibly centrally transmit any desired information and to provide such information on a seat or imaging region provided for this.

The system according to the invention can be used in locations comprising a multitude of seats, for example in cinemas, stadiums, convention halls, in the aircraft industry, in the railway and in ships, as well as in the automotive industry.

The embodiments of the device also apply to the method and to the aircraft as well as to their use and vice-versa.

With the system according to the invention for displaying image elements an effective system is provided by means of which in a flexible manner all kinds of information can be displayed without there being a need to install permanently installed display elements such as, for example, displays. This provides greater freedom of design and simple changeover processes relating to seating configurations so that the periods of time required for reconfiguration work can be shortened and costs can be reduced.

BRIEF DESCRIPTION OF THE DRAWINGS

Below, for further explanation and to provide a better understanding of the present invention, exemplary embodiments are described in more detail with reference to the enclosed drawings. The following are shown.

DESCRIPTION OF PREFERRED EMBODIMENTS OF THE INVENTION

Figure 1:
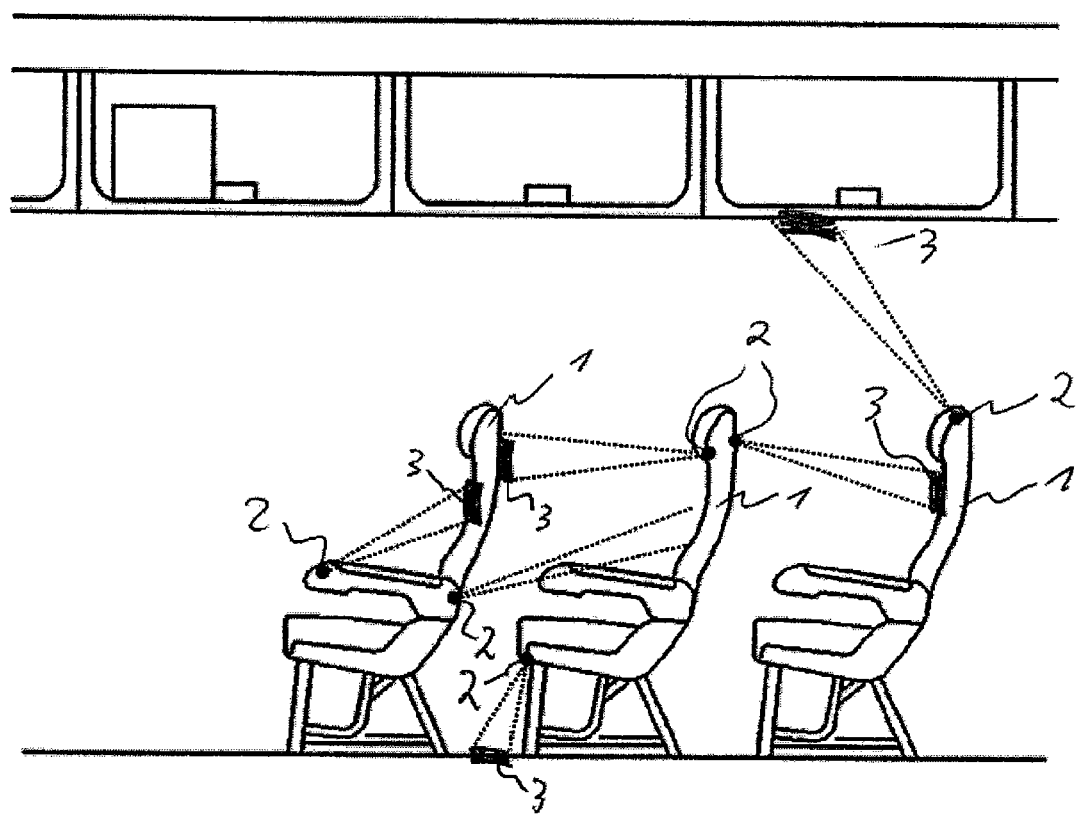
FIG. 1-FIG. 3 diagrammatic views of a seating configuration with possible installation locations of the image projection device and of the imaging region according to exemplary embodiments of the invention.

Identical or similar components in different figures have the same reference characters. The illustrations in the figures are diagrammatic and not to scale.

FIG. 1 shows a system for displaying image elements for an aircraft seat according to an exemplary embodiment of the invention. The system comprises a seat element 1 with an image projection device 2 and with an imaging region 3 for displaying an image element. In this arrangement the image projection device 2 is designed such that the image element can be projected onto the imaging region 3.

In a longitudinal section of an aircraft fuselage FIG. 1 further shows various exemplary installation locations of the image projection device 2, as well as various options of imaging the image element on a flexible imaging region 3. The image projection device 2 can be installed in an armrest of a seat and can image the imaging region 3 on the front of a backrest of a seat element 1. Furthermore, the projection device 2 can be arranged on the front of a backrest and can image the imaging region 3 on the rear of a backrest of a seat element 1. Moreover, the image projection device 2 can be arranged on the rear of an armrest so that the image element or the imaging region 3 is imaged on the front of a backrest of a seat element 1. Furthermore, the image projection device 2 can have the imaging region 3 imaged on an overhead region, for example a ceiling or an overhead stowage space.

Figure 2:
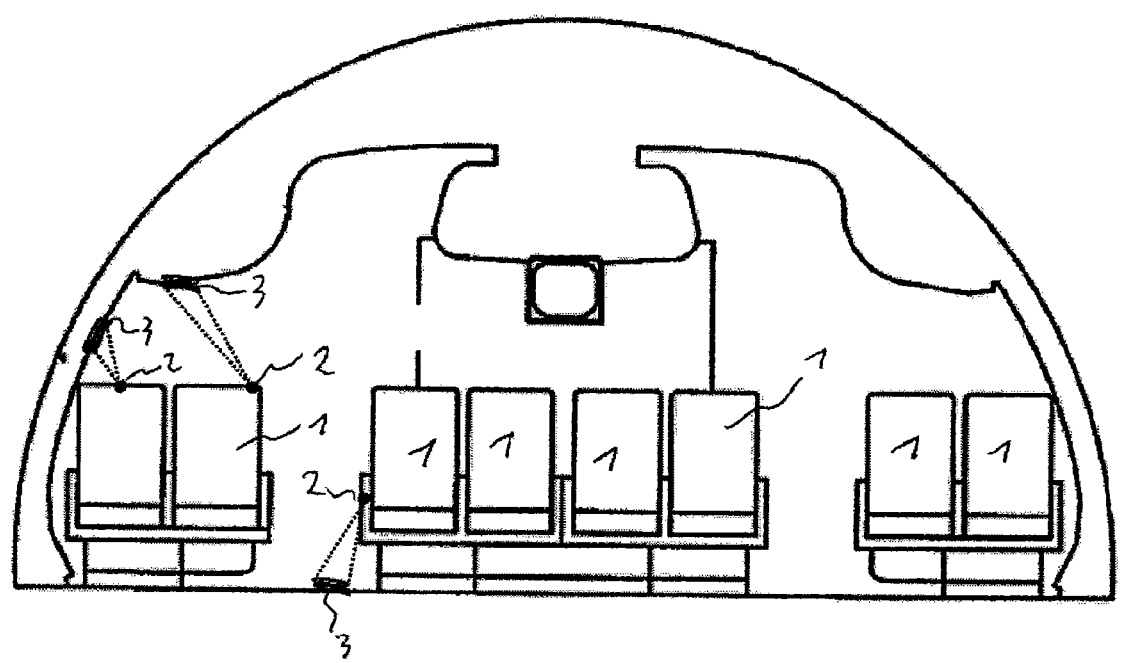

In a cross section of an aircraft fuselage FIG. 2 shows a seating configuration in an aircraft cabin. In this arrangement the image projection device 2 can, for example, be arranged at the top or on a headrest of a seat element 1 and can image the imaging region 3 on the side wall or on an overhead region. Furthermore, it is imaginable that the image projection device 2 images the imaging region 3 on the floor.

Figure 3:
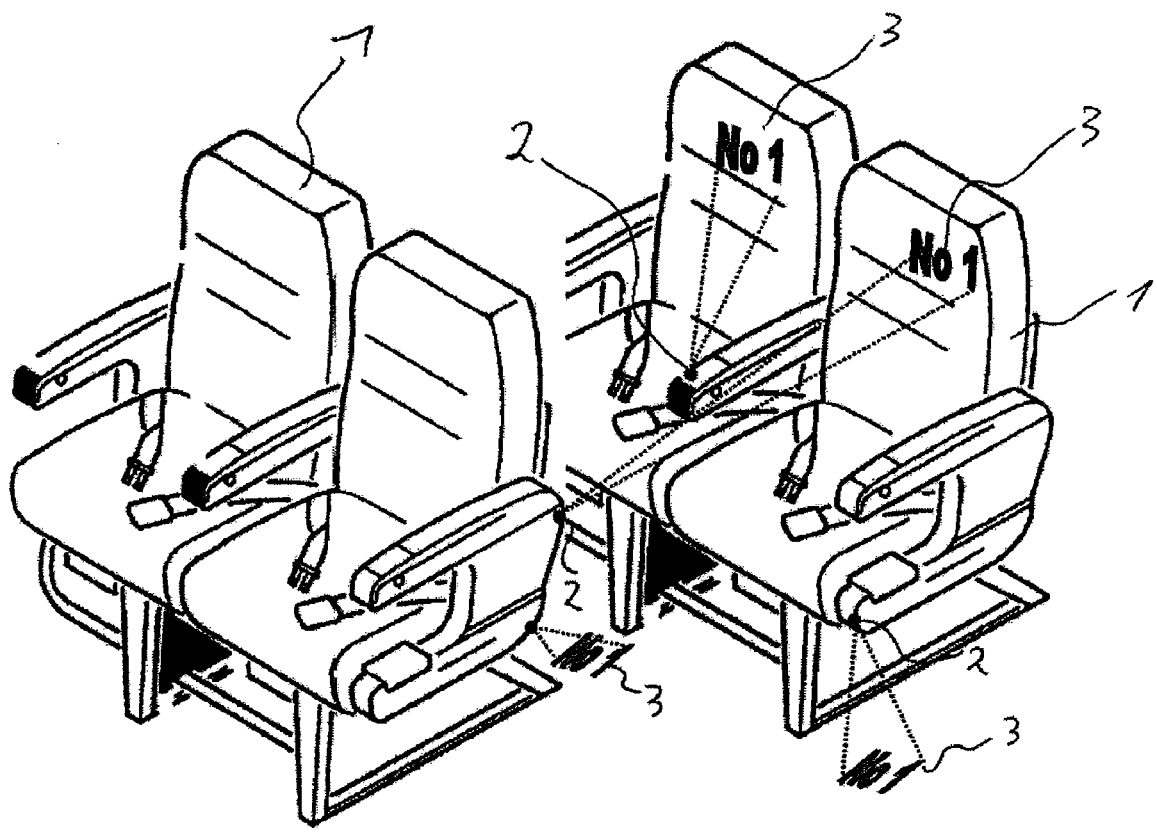

This is also clearly shown in FIG. 3 where, for example, the image projection device 2 is arranged at the bottom of an aircraft seat 1, and the imaging region 3 is implemented on the floor. It can also be derived that the image projection device 2 can be arranged in an armrest of a seat element 1 and can image the imaging region on the front of a backrest of a seat 1.

Further combinations of the installation locations of the image projection device 2 and locations of the imaging region 3 that are not explicitly shown in FIGS. 1 to 3 can also be provided.

Figure 4:
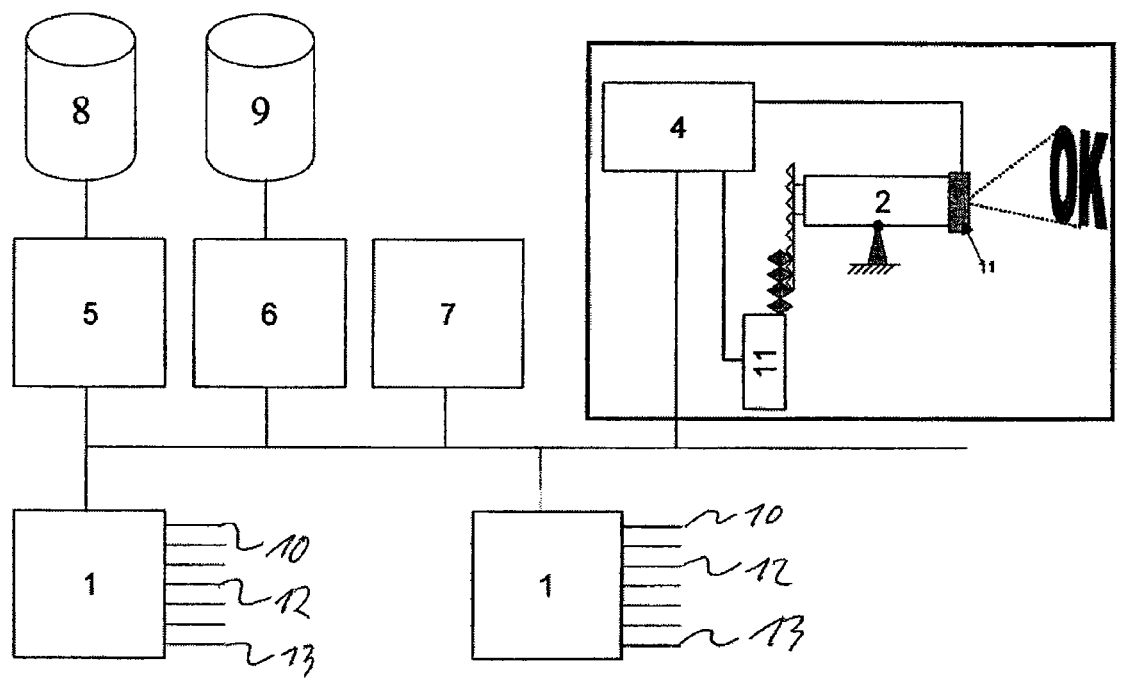
FIG. 4 a diagrammatic view of a possible networking architecture comprising various elements according to an exemplary embodiment of the invention.

FIG. 4 shows an exemplary arrangement of various elements and their networking architecture. The system for displaying image elements 20 comprises a control unit 4, which can be arranged in an aircraft seat 1. Furthermore, the system 20 comprises an image adjustment device 11 for adjusting image characteristics of the image element, which image adjustment device 11 is in communication with the control unit 4 and with the image projection device 2. The image adjustment device 11 can, for example, comprise an electromechanical positioning device. This can, for example, be implemented by way of an electric motor, an endless screw or a toothed rack. The image adjustment device 11 can receive instructions from the control unit 4 and in response to these instructions can adjust the projector or the image projection device 2. In this process not only the position of the imaging region 3 but also the image characteristics, for example focusing or the size of the image element, can be adjusted. The image adjustment device 11 or the image projection device 2 can be manually controlled or can be electronically controllable, i.e. for example by means of a mechanical rotary button or by means of an electronic switch.

In FIG. 4 the seat elements 1 comprise, for example, seat-state sensors 10 which can, for example, detect the inclination of the backrest, the height of the seat, or the rotary position of the seat. Moreover, the seat-state sensors 10 can detect seat-states such as, for example, the status of the seat belt buckle, the status of the airbag, or the status of the seat, i.e. whether it is free or occupied. This information can be transmitted either directly to the control unit 4 of the seat, or to a central control unit 5. On the basis of the first position sensors 12 or the second position sensors 13, the decentralised control unit 4, which can be affixed to each seat, or the central control unit 5, which is connected to many seat elements 1, can, for example, determine the first position coordinates of the image projection device 2 or the second position coordinates of the image region 3, and from these it can calculate the distance. The control unit 4 can subsequently control the image adjustment device 11 so that good image quality of the image element can be provided, such as for example by means of autofocusing and the adjustability of the image size. At the same time, manual adjustment or focusing by the user can remain active.

The data of the seat-state sensors 10 can be transmitted to a central control unit 5 or to a decentralised control unit 4, which is, for example, responsible for seat monitoring. In the case of a hazardous situation or resulting from it in the case of obligatory wearing of seat belts, based on the seat-occupation state and on monitoring the buckles of seat belts, the control unit 4; 5 detects whether or not a passenger has their seat belt fastened. If a passenger does not have their seat belt fastened, a signal can be transmitted to the control unit 4, 5 or to the image projection device 2 so that a warning can be displayed in the imaging region 3. In addition, the central or decentralised control unit 4; 5 can be connected to a database 8 which provides, for example, seat-specific information such as, for example, names of the passengers to whom the seats have been allocated, or other seat-specific or general information. Furthermore, the decentralised control unit 4 or the central control unit 5 can be connected to a multimedia system 6, for example to an in-flight entertainment system (IFE). This multimedia system 6 can be connected to a database 9 so that infotainment or entertainment offers can be provided. For example, information- or entertainment films can be provided individually to the control device 4; 5 in a seat element 1 and can be presented in the imaging region 3 by way of the image projection device 2.

Furthermore, additional systems 7 can be connected to the network, for example oxygen monitoring systems or air conditioning equipment or temperature control systems so that details about the ventilation- or temperature state of an aircraft seat 1 can be informatively provided to the passengers by presenting it in the imaging region.

By integrating an image projection device 2 in a seat element 1, and by networking the image projection device 3 or a control device 4, 5 with a network, the visual display of an image element can be linked depending on messages of the various sensors 10, 12, 13 or control devices 4, 5. The control devices or the sensors 10, 12, 13 in the seat register the states or characteristics of the seat, for example seat number, maximum extension position reached, passenger's seat belt not fastened, wherein the seat-state data can be transmitted to the image projection device 2 electronically or by way of optics, with said image projection device 2, by way of a light ray, displaying the seat-state data in the form of image elements in an imaging region 3.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

What is claimed is:

1. A system for displaying image elements for an aircraft seat, with the system comprising:
   an imaging region for displaying an image element, the imaging region comprising position coordinates;
   a seat element with an image projection device operable to project the image element onto the imaging region, the image projection device being also operable to flexibly adjust the position coordinates of the imaging region such that the imaging region is positionable in various locations, the image projection device comprising an image adjustment device for adjusting image characteristics of the image element; and
   a control unit operable to automatically control the image projection device depending on the position coordinates of the imaging region.

2. The system of claim 1,
   wherein the image projection device comprises position coordinates;
   wherein the control unit is designed to control the image projection device depending on the position coordinates of the image projection device and depending on the position coordinates of the imaging region.

3. The system of claim 2,
   wherein the control unit is designed to control the image adjustment device if there is a change in the position coordinates of the image projection device and/or in the position coordinates of the imaging region.

4. The system of claim 2,
   wherein the image projection device comprises a first position sensor;
   wherein the first position sensor is designed to determine the position coordinates of the image projection device.

5. The system of claim 2,
   wherein the imaging region comprises a second position sensor;
   wherein the second position sensor is designed to determine the position coordinates of the imaging region.

6. The system of claim 1,
   wherein the seat element comprises a seat-state sensor;
   wherein the seat-state sensor is designed to determine seat-state data of the aircraft seat;
   wherein the control unit is designed to evaluate the seat-state data, and to display it in the imaging region by means of the image projection device.

7. The system of claim 1,
wherein the imaging region is arranged in a first region;
wherein the first region is selected from the group comprising the backrest of a seat, the armrest of a seat, a seat cover, an overhead region and a floor region.

8. The system of claim 1,
wherein the image projection device is arranged in a second region;
wherein the second region is selected from the group comprising the backrest of a seat, the armrest of a seat, a seat cover and a headrest.

9. The system of claim 1,
wherein the control unit is arranged in the seat element.

10. The system of claim 1,
wherein the system further comprises a multitude of seat elements;
wherein each of the multitude of seat elements comprises an image projection device;
wherein the control unit is designed to control the respective image projection devices of the multitude of seat elements.

11. The system of claim 1,
wherein at least one of the control units and of the image projection devices is equipped for connection to a network;
wherein by way of the network, information can be provided.

12. A method for displaying image elements for an aircraft seat, wherein the method comprises:
projecting an image element on an imaging region by means of an image projection device of a seat element, wherein the imaging region comprises position coordinates;
using the image projection device to flexibly adjust the position coordinates of the imaging region so as to change a location of the imaging region;
adjusting image characteristics of the image element using an image adjustment device of the image projection device;
using a control unit to automatically control the image projection device depending on the position coordinates of the imaging region.

13. The use of a system for displaying image elements for an aircraft seat of claim 1 in an aircraft.

14. An aircraft comprising a system for displaying image elements for an aircraft seat of claim 1.

\* \* \* \* \*